US012152735B2

(12) United States Patent
Pelger (10) Patent No.: US 12,152,735 B2
(45) Date of Patent: Nov. 26, 2024

(54) CONTROL UNIT AND METHOD FOR SETTING THE PRESSURE IN THE REMOVAL LINE OF A PRESSURE CONTAINER (71) Applicant: Bayerische Motoren Werke Aktiengesellschaft, Munich (DE)

(72) Inventor: Andreas Pelger, Ismaning (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 214 days.

(21) Appl. No.: 17/927,799

(22) PCT Filed: May 20, 2021

(86) PCT No.: PCT/EP2021/063437
§ 371 (c)(1),
(2) Date: Nov. 25, 2022

(87) PCT Pub. No.: WO2021/239566
PCT Pub. Date: Dec. 2, 2021

(65) Prior Publication Data
US 2023/0213147 A1    Jul. 6, 2023

(30) Foreign Application Priority Data
May 26, 2020   (DE) .................. 10 2020 113 995

(51) Int. Cl.
*F17C 5/00*   (2006.01)
(52) U.S. Cl.
CPC ...... *F17C 5/007* (2013.01); *F17C 2205/0326* (2013.01); *F17C 2205/0352* (2013.01);
(Continued)

(58) Field of Classification Search
CPC ........ F17C 2250/0626; F17C 2250/043; F17C 2250/0417; F17C 2250/03;
(Continued)

(56) References Cited

U.S. PATENT DOCUMENTS 10,408,211 B2 *  9/2019  Yuan ..................... F17C 5/06
2007/0012362 A1  1/2007  Thyroff
(Continued)

FOREIGN PATENT DOCUMENTS

DE   10 2006 031 875 A1   2/2007
DE   10 2015 217 478 A1   3/2016
(Continued)

OTHER PUBLICATIONS

International Search Report (PCT/ISA/210) issued in PCT Application No. PCT/EP2021/063437 dated Aug. 10, 2021 with English translation (five (5) pages).
(Continued)

*Primary Examiner* — Timothy L Maust
(74) *Attorney, Agent, or Firm* — Crowell & Moring LLP (57) ABSTRACT

A control unit for a pressure container system comprising at least one pressure container with a pressure container valve designed to conduct fuel from the pressure container into a removal line for supplying an energy converter. The control unit is designed to determine that a fueling procedure of the pressure container is occurring or has occurred. In response thereto, the control unit is additionally designed to cause the pressure container valve to open in a pulsed manner temporally prior to a removal request for fuel for operating the energy converter so that the pressure in the removal line approximates the pressure in the pressure container.

21 Claims, 2 Drawing Sheets

(52) U.S. Cl.
CPC .. *F17C 2221/012* (2013.01); *F17C 2221/033* (2013.01); *F17C 2250/03* (2013.01); *F17C 2250/0417* (2013.01); *F17C 2250/043* (2013.01); *F17C 2250/0626* (2013.01); *F17C 2265/065* (2013.01); *F17C 2270/0168* (2013.01); *F17C 2270/0184* (2013.01)

(58) Field of Classification Search
CPC ...... F17C 2205/0352; F17C 2205/0326; F17C 2265/065; F17C 2270/0168; F17C 2270/0184
See application file for complete search history.

(56) References Cited

U.S. PATENT DOCUMENTS

| | | |
|---|---|---|
| 2014/0109974 A1 | 4/2014 | Zoz |
| 2016/0240873 A1 | 8/2016 | Kato et al. |

FOREIGN PATENT DOCUMENTS

| | | |
|---|---|---|
| DE | 10 2015 117 096 A1 | 4/2016 |
| DE | 10 2015 013 063 A1 | 4/2017 |
| JP | 2013-167291 A | 8/2013 |

OTHER PUBLICATIONS

German-language Written Opinion (PCT/ISA/237) issued in PCT Application No. PCT/EP2021/063437 dated Aug. 10, 2021 (six (6) pages).

German-language Search Report issued in German Application No. 10 2020 113 995.0 dated Feb. 1, 2021 with partial English translation (15 pages).

* cited by examiner

CONTROL UNIT AND METHOD FOR SETTING THE PRESSURE IN THE REMOVAL LINE OF A PRESSURE CONTAINER

BACKGROUND AND SUMMARY

The technology disclosed here relates to a pressure container system having one or more pressure containers, for example, for a motor vehicle. The technology disclosed here further relates to a method and a corresponding control unit for setting the pressure in the removal line from a pressure container of a pressure container system of this kind.

A motor vehicle may have at least one fuel cell, which, on the basis of a fuel such as hydrogen, generates electrical energy for the operation, in particular for the propulsion of the vehicle. The fuel can be stored in a pressure container system having at least one pressure container. By opening a valve, in particular a so-called on-tank valve (OTV), the fuel can be guided from the pressure container, via a removal line, to the fuel cell of the vehicle.

During operation of the pressure container system, there may be significant pressure differences between different components, in particular, between the one or more pressure containers and the one or more lines, of the pressure container system, which may lead to a relatively high loading of the pressure container system and/or to inaccuracies in the fuel supply of the fuel cell.

It is a preferred object of the technology disclosed herein to reduce or to overcome at least one disadvantage of a previously known solution or to propose an alternative solution. It is a preferred object of the technology disclosed here to allow efficiently the most conserving and/or precise operation possible of a pressure container system.

The objects may be achieved by the subject matter of the independent claims. The dependent claims describe preferred embodiments.

According to one aspect, a control unit for a pressure container system, in particular, for a pressure container system for a motor vehicle (for example, for a passenger vehicle, for a motorbike, for a commercial vehicle, etc.) is described. The pressure container system is used here typically for the storage of fuel that is gaseous under ambient conditions. The pressure container system can be used for example in a motor vehicle that is operated with compressed natural gas (CNG) or liquid natural gas (LNG) or with hydrogen (in particular $H_2$) as fuel. The pressure container system is typically fluidically connected to at least one energy converter which is configured to convert chemical energy of the fuel into one or more other energy forms.

Such a pressure container system comprises at least one pressure container, in particular, a composite overwrapped pressure vessel. The pressure container can be, for example, a cryogenic pressure container or a high-pressure gas container.

High-pressure gas containers are designed to store fuel at ambient temperatures permanently at a nominal working pressure (NWP) of at least 350 bar gauge (=positive pressure in relation to atmospheric pressure) or at least 700 bar gauge. A cryogenic pressure container is suitable for storing the fuel at the aforementioned working pressures and also at temperatures that lie considerably (for example more than 50 Kelvin or more than 100 Kelvin) below the working temperature of the motor vehicle.

The pressure container system described in this document comprises at least one pressure container with a pressure container valve, where the pressure container valve is designed to conduct (gaseous) fuel from the pressure container into a removal line for supplying an energy converter. Here, a pressure converter is typically arranged between the removal line and the energy converter and is configured to convert fuel having a relatively high pressure (for example, 100 bar gauge or more) from the removal line into fuel having a relatively low pressure (for example, 15 bar gauge or less). The pressure of the fuel can then be further reduced as appropriate at the energy converter (for example, to 2 bar gauge or less). For this purpose, a proportional valve or an injector can be used.

The pressure container valve can be a so-called on-tank valve (OTV) or part of an OTV. Typically, a combination of an electromagnetically actuated valve, a manually actuated valve and possibly a thermal pressure relief device (TPRD) is typically referred to as an OTV. The electromagnetically actuated valve and the manually actuated valve can, in particular, be connected in series, wherein one or both of them can be a tank shut-off valve.

The energy converter is configured to convert chemical energy of the fuel into one or more other energy forms, for example, into electrical energy and/or into kinetic energy. The energy converter can be, for example, an internal combustion engine or a fuel cell system or a fuel cell stack comprising at least one fuel cell.

The control unit is configured to determine that a fueling procedure of the pressure container is occurring or has occurred. The pressure container can be fueled here via a fueling access point of the pressure container system and via a feed line from the fueling access point to the pressure container. The control unit can be configured to determine sensor data of a pressure sensor in the feed line to the pressure container. It can then be determined precisely and reliably on the basis of the sensor data of the pressure sensor in the feed line (in particular on account of a pressure rise in the feed line) that a fueling procedure of the pressure container is occurring or has occurred.

The control unit is also configured, in response to the identified fueling procedure, to cause the pressure container valve to open (already) temporally prior to a removal request for fuel for operating the energy converter. In other words, it can cause the pressure container valve to open also (during and/or after a fueling procedure) if there is no specific removal request for fuel for operating the energy converter.

Here, the opening of the pressure container valve is designed so that the pressure in the removal line approximates and/or is aligned with the pressure in the pressure container (even before (for the first time after the fueling procedure) a removal request for fuel for operating the energy converter is present). For this purpose the pressure container valve can be opened during the fueling procedure and/or following the fueling procedure. The pressure container valve can be opened here in a pulsed or clocked and/or pulse-based manner (for example, with a pulse duration of 100 ms or less). The pressure container valve can advantageously be opened here in pulsed or clocked or pulse-based operation, at most within 400 milliseconds, at most within 200 milliseconds, or at most within 100 milliseconds.

For example, the pressure in the removal line can thus be set particularly precisely and reliably. Alternatively (in particular once the fueling procedure is complete), the pressure container valve can be open continuously for a specific period of time (for example, between 0.5 and 2 seconds).

During or after a fueling procedure, the pressure in the removal line can thus be approximated to or aligned with the internal pressure of the pressure container (even before (for the first time after the fueling procedure) a removal request for fuel for operating the energy converter is present). The loading of the pressure container system during opening of the pressure container valve for a removal request can thus be reduced. Furthermore, the accuracy of the pressure measurement and thus the accuracy of the fuel feed during the opening of the pressure container valve for a removal request can be increased.

The control unit can be configured, once the pressure in the removal line has approximated and/or aligned with the pressure in the pressure container, to determine that a removal request for fuel for operating the energy converter is present. For example, a control signal can be received by the energy converter and/or by a control unit for operating the energy converter (for example, by a drive control unit), the control signal indicating that fuel is to be removed from the pressure container in order to operate the energy converter.

In response to the received removal request, the pressure container valve can be caused to be opened (continuously) in order to conduct fuel from the pressure container into the removal line for supplying the energy converter. The pressure balancing occurring here in the removal line and/or the compression of the fuel occurring here in the removal line are relatively small on account of the preparatory pressure approximation (after or during the fueling procedure), so that it is possible to supply fuel to the energy converter conservingly and precisely.

The control unit can be configured to cause the pressure container valve to open in a pulse-based and/or temporally limited manner during the fueling procedure so that fuel is conducted from the pressure container into the removal line. Alternatively or additionally, the control unit can be configured to cause the pressure container valve to be opened during the fueling procedure on the whole for at most 5% or less of the total duration of the fueling procedure so that the pressure in the removal line during the fueling procedure approximates or aligns with the pressure in the pressure container. By way of a temporally limited and/or pulse-based opening of the pressure container valve, the pressure adjustment in the removal line can be effected without significant detriment to the reliability of the fueling procedure.

The control unit can be configured to determine that the fueling procedure has been completed on the basis of one or more indices. Exemplary indices are: the fact that there is no longer a pressure rise in the pressure container and/or in the feed line; the fact that the pressure container has reached or exceeded a specific fill level (for example, between 90% and 95%); the fact that the fueling access point (in particular a fuel filler flap) of the pressure container system has been sealed or closed; and/or the fact that a user of the energy converter is preparing for an activation of the energy converter and for an associated removal request for fuel (for example, the user is preparing to start a vehicle by actuating the start/stop button of the vehicle).

In response to the identified end of the fueling procedure, the pressure container valve can then be made to open after the end of the fueling procedure but prior to a (first-time) removal request for fuel so that fuel is conducted from the pressure container into the removal line. In particular, the pressure container valve can be made to open a predetermined time (for example, between 5 and 10 seconds) after it has been determined that the fueling procedure has been completed. By opening the pressure container valve following the fueling procedure, effects on the fueling procedure resulting from the opening of the pressure container valve can be avoided entirely.

The control unit can be configured to control the pressure container valve in order to set a pressure in the removal line that lies below the pressure in the pressure container by a specific offset value. Alternatively or in addition, the control unit can be configured to control the pressure container valve in such a way that (following the pressure approximation), when a removal request is present, the pressure in the removal line lies below the pressure in the pressure container by a specific offset value. The offset value can be, for example, a specific fixed value (for example, between 20 bar and 100 bar), or the offset value can be a percentage of the internal pressure of the pressure container (for example, between 10% and 20%). By setting the pressure in the removal line in this way, a reliable monitoring of the internal tightness of the pressure container valve (on the basis of the pressure difference between the pressure container and the removal line) and thus a particularly safe and reliable operation of the pressure container system can be made possible.

As already presented above, the control unit can be configured to cause the pressure in the removal line during the fueling procedure to approximate and/or align with the pressure in the pressure container (by opening the pressure container valve). Furthermore, the control unit can be configured to determine sensor data of a pressure sensor in the removal line.

The pressure in the feed line to the pressure container can then be determined and/or checked in a precise manner on the basis of the sensor data of the pressure sensor in the removal line. The reliability and safety of the fueling procedure can thus be further increased.

The control unit can be configured to determine the system pressure of the pressure container system during the fueling procedure on the basis of the sensor data of the pressure sensor in the removal line. Furthermore, the control unit can be configured to send the system pressure (for example, via an infrared interface) to the fueling unit (in particular to the fuel pump) from which fuel for the fueling procedure is provided. For example, a so-called COM fueling with an increased filling of the pressure container can be enabled (possibly also in the event of failure of the pressure sensor in the feed line).

The control unit can be configured to determine sensor data of a pressure sensor in the feed line to the pressure container. The pressure in the feed line displayed by the sensor data of the pressure sensor in the feed line can then be compared with the pressure in the removal line displayed by the sensor data of the pressure sensor in the removal line. The fueling procedure of the pressure container (this also typically includes the determination of the fill level of the pressure container) and/or the pressure container valve can then be monitored and/or controlled depending on the comparison. For example, a signal (for example, a termination signal) can be sent to the fueling unit for the fueling procedure depending on the comparison. The fueling unit can then cause, for example, the termination of the fueling procedure. For example, the reliability of the fueling procedure and/or of the operation of the pressure container device can be further increased.

As already presented above, the control unit can be configured to cause the pressure in the removal line to approximate and/or align with the pressure in the pressure container. This can be performed during and/or after the fueling procedure. The fill level of the pressure container can then be determined and/or checked on the basis of the sensor data of the pressure sensor in the removal line. Information regarding the fill level can then be output via a user interface.

By taking into consideration the pressure in the removal line, the accuracy of the determined fill level can be increased (in comparison to the determination of the fill level on the basis of the sensor data of the pressure sensor in the feed line).

The pressure container system can possibly comprise at least two pressure containers each having at least one pressure container valve (which are filled within the scope of the fueling procedure). The control unit can be configured to cause the pressure container valves of the at least two pressure containers to be opened in succession and/or in alternation so that the pressure in the removal line approximates the pressure in the pressure container. The loading of the pressure container system can thus be further reduced.

Alternatively or additionally, the control unit can be configured to cause the pressure container valve of the pressure container which (from the two or all pressure containers) has the lowest pressure loss (for example, the shortest feed line with equally sized pressure containers and/or the lower mass flow with differently sized pressure containers) in the feed line for the fueling procedure to open so that the pressure in the removal line approximates the pressure in the pressure container. It can thus be achieved that the pressure in the removal line is approximated to the highest pressure of the pressure container system, whereby the loading of the pressure container system can be further reduced in the event of a removal request.

According to a further aspect, a pressure container system is described, in particular, for a motor vehicle. The pressure container system comprises at least one pressure container comprising a pressure container valve which is designed to conduct fuel from the pressure container into a removal line for supplying an energy converter. Furthermore, the pressure container system comprises the control unit described in this document, the control unit being configured to control the pressure container valve (to approximate the pressure in the removal line to the internal pressure of the pressure container).

According to a further aspect, a (road) motor vehicle (in particular a passenger vehicle or a truck or a bus or a motorbike) is described which comprises the pressure container system described in this document.

According to a further aspect, a method is described for operating a pressure container system which comprises at least one pressure container having a pressure container valve which is designed to conduct fuel from the pressure container into a removal line for supplying an energy converter. The method comprises determining that a fueling procedure of the pressure container is occurring or has occurred. Furthermore, in response thereto, the method comprises causing the pressure container valve to open temporally prior to a removal request for fuel for operating the energy converter (in particular prior to a first-time removal request following the identified fueling procedure) so that the pressure in the removal line approximates the pressure in the pressure container. The pressure container valve can be opened here preferably in a pulsed or pulse-based and/or clocked manner so that the pressure in the removal line is approximated as precisely and conservingly as possible to the pressure in the pressure container.

The control unit is preferably configured to cause the pressure container valve to open in particular during a fueling procedure only if the internal pressure of the pressure container is at least 30%, at least 50%, or at least 70% of the maximum fueling end pressure or of the nominal working pressure.

According to a further aspect, a software (SW) program is described. The SW program can be configured to be run on a processor (for example, on a control unit of a vehicle) and to thus perform the method described in this document.

In accordance with a further aspect, a storage medium is described. The storage medium can comprise an SW program which is configured to be run on a processor and to thus perform the method described in this document.

It should be noted that the methods, devices and systems described in this document can be used both alone and in combination with other methods, devices and systems described in this document. Furthermore, all aspects of the methods, devices and systems described in this document can be combined with one another in many ways. In particular, the features of the claims can be combined with one another in many ways.

BRIEF DESCRIPTION OF THE FIGURES

The invention will be described in greater detail hereinafter on the basis of exemplary embodiments. In the figures.

DETAILED DESCRIPTION OF THE FIGURES

Figure 1:
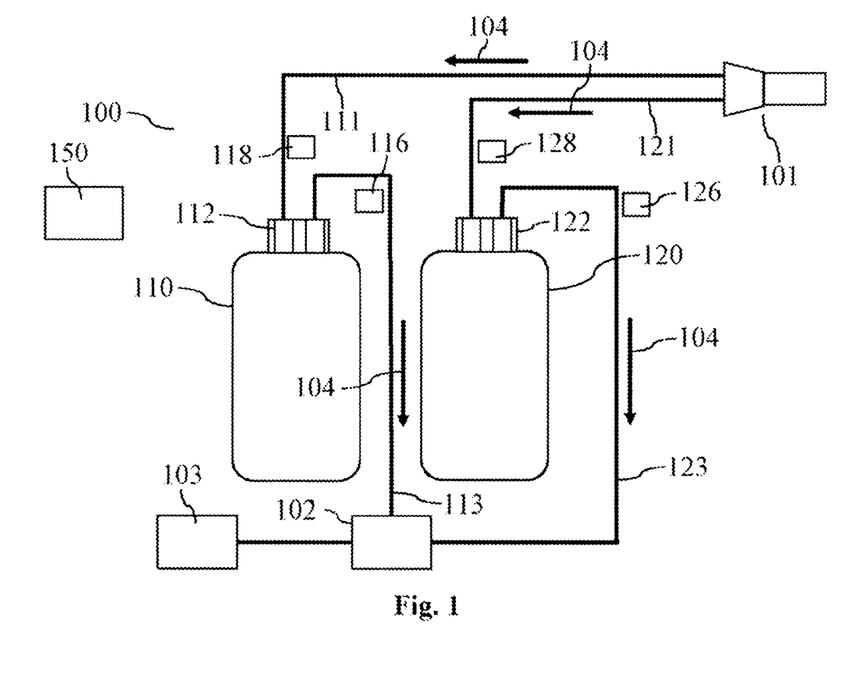
FIG. 1 shows an exemplary pressure container system having a plurality of pressure containers.

As stated at the outset, the present document addresses the problem of allowing the most conserving and/or precise operation possible of a pressure container system. In this regard, FIG. 1 shows an exemplary pressure container system 100 having a first pressure container 110 and a second pressure container 120. The pressure containers 110, 120 have valve devices 112, 122 respectively (for example, OTVs), via which the inflow and the outflow of fuel 104 to and from the pressure containers 110, 120 can be controlled.

The pressure container system 100 shown in FIG. 1 comprises feed lines 111, 121 which are designed to carry fuel 104 from a fueling access point 101 to the pressure containers 110, 120. A first feed line 111 is guided to an inlet of the first valve device 112 of the first pressure container 110. Similarly, a second feed line 121 is guided to an inlet of the second valve device 122 of the second pressure container 120. Both pressure containers 110, 120 can thus be refueled from one fueling access point 101. The pressure container system 100 can comprise pressure sensors 118, 128 configured to detect sensor data relating to the pressure in the feed lines 111, 121, respectively.

The pressure container system 100 further comprises a first removal line 113 connected to an outlet of the first valve device 112, and a second removal line 123 connected to an outlet of the second valve device 122. Fuel 104 can be guided from the pressure containers 110, 120 to a pressure converter 102 via removal lines 113, 123. Typically, the pressure in the pressure containers 110, 120 is higher than the working pressure of an energy converter 103 (for example, of a fuel cell or a fuel cell stack). For example, the working pressure of an energy converter 103 can be about 2 bar. The pressure in a pressure container 110, 120 is, for example, greater than the working pressure of an energy converter 103 by a factor of 20, 50, 100 or 200. The pressure converter 102 (in particular a pressure controller) can be configured to reduce the pressure of the fuel 104 from the pressure containers 110, 120 (for example, to an intermediate pressure in the range between 10-20 bar). The pressure of the fuel 104 can then be further reduced at the energy converter 103 to the working pressure of the energy converter 103.

The pressure container system 100 can comprise one or more pressure sensors 116, 126 which are configured to detect sensor data with respect to the pressure in the particular sampling line 113, 123. In this regard, a pressure sensor 116, 126 can in each case comprise at least one temperature sensor which is configured to detect sensor data with respect to the temperature of the measurement diaphragm of the pressure sensor 116, 126 (where the temperature of the measurement diaphragm of the pressure sensor 116, 126 typically depends on the temperature of the fuel 104 in the removal line 113, 123).

Figure 2:
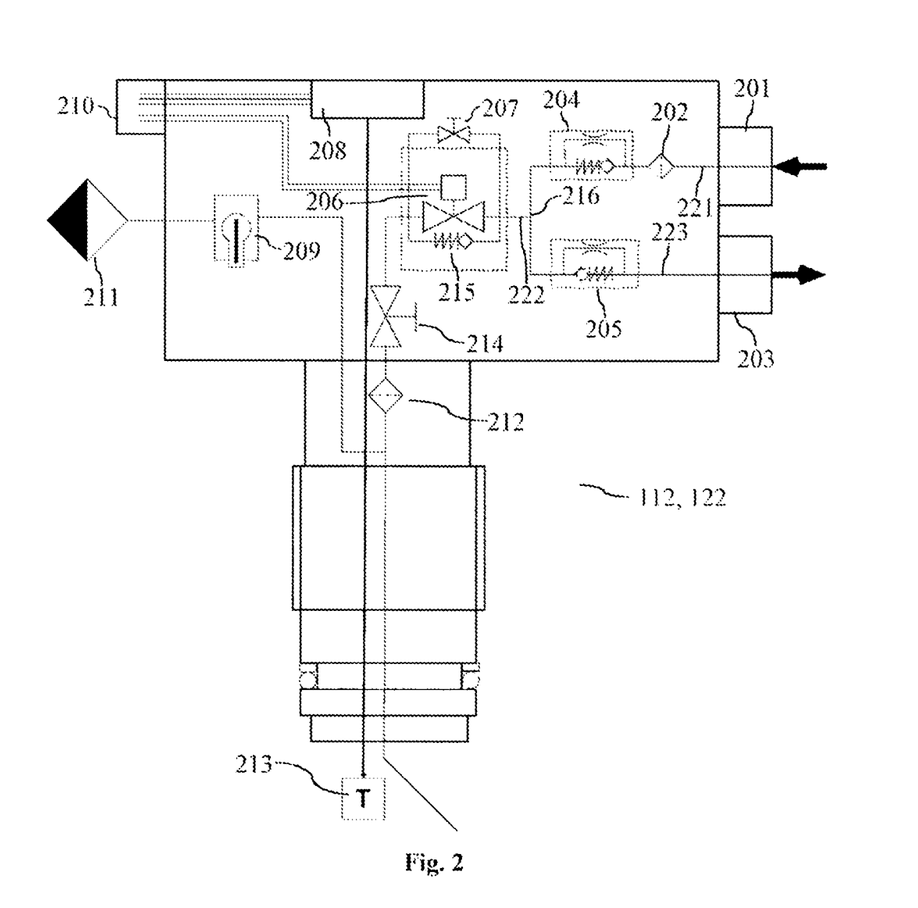
FIG. 2 shows an exemplary valve device for a pressure container.

FIG. 2 shows an exemplary valve device 112, 122 for a pressure container 110, 120. The valve device 112, 122 comprises an inflow interface 201 for coupling a feed line 111, 121, and an outflow interface 203 for coupling a removal line 113, 123. The fuel 104 supplied via the inflow interface 201 can be filtered in an inflow filter 202 to prevent or reduce contamination of the pressure container 110, 120 and/or of a seal seat of the valve device 112, 122.

The inflow channel 221 comprising the inflow interface 201 for supplying fuel 104 and the outflow channel 223 comprising the outflow interface 203 for discharging fuel 104 can be coupled to each other at a coupling point 216 and to a common channel 222. The common channel 222 can connect the coupling point 216 to the interior of a pressure container 110, 120.

The common channel 222 can comprise an electrically actuatable valve 206. The electrically actuatable valve 206 can be electrically conductively connected to a data interface 210 of the valve device 112, 122 via a data bus. A control signal indicating whether the electrically actuatable (pressure container) valve 206 is to be opened or closed can be received via the data interface 210. The electrically actuatable valve 206 can comprise, for example, an electromagnetic valve. The control signal can be provided by a control unit 150 of the pressure container system 100.

A check valve 216 can be arranged parallel to the electrically actuatable valve 206. The check valve 215 can be arranged in such a way as to prevent fuel 104 from escaping from the pressure container 110, 120, but to allow fuel 104 to be fed into the pressure container 110, 120 (for example, during a fueling procedure) by overcoming the restoring force of the check valve 215. Furthermore, the electrically actuatable valve 206 can be bypassed by a manual valve 207, if necessary. The manual valve 207 can be manually opened, for example, by maintenance personnel, to at least partially defuel the pressure container 110, 120.

The inflow channel 221 and the outflow channel 223 can thus extend together into the interior of the pressure container 110, 120 from the coupling point 216 via the common channel 222. In this regard, the common channel 222 can pass via a further manual valve 214 that can be used to manually close or open a pressure container 110, 120. Furthermore, the common channel 222 can pass via a further drain filter 212 that can be used to filter the fuel 104 prior to the delivery to the energy converter 103.

The valve device 112, 122 can further comprise a temperature sensor 213 having an evaluation unit 208 which is connected to the data interface 210. Thus, sensor data relating to the temperature of the pressure container 110, 120 and/or the stored fuel 104 can be provided. In addition, the valve device 112, 122 can comprise a pressure relief unit 209 (for example, a thermal pressure release device, TPRD) designed to open the pressure container 110, 120 when a temperature threshold is reached or exceeded, in order to release fuel 104 via a venting unit (in particular an opening) 211 and thereby to reduce the pressure in the interior of the pressure container 110, 120.

The outflow channel 223 can comprise a flow restriction unit 205 between the coupling point 216, where the outflow channel 223 and the inflow channel 221 converge, and the outflow interface 203, the flow restriction unit being configured to restrict and, if necessary, prevent a backward flow of fuel 104 from the outflow interface 203 to the coupling point 216. The flow restriction unit 205 can comprise a check valve configured to completely prevent a backward flow. Alternatively or additionally, the flow restriction unit 205 can comprise (for example, parallel to the check valve) a throttle configured to limit the backward flow to a certain maximum value (for example, to a maximum value of the mass flow and/or the volume flow).

Similarly, a flow restriction unit 204 can also be arranged on the inflow channel 221 between the inflow interface 201 and the coupling point 216 and restricts (for example, by means of a throttle) and/or blocks (for example, by means of a check valve) the backward flow of fuel 104 from the pressure container 110, 120 to a certain maximum value. In this way, fuel flows can be limited for pressure balancing via the feed lines 111, 121 (for example, at the beginning of a fueling procedure).

After regular fueling of the one or more pressure containers 110, 120, the pressure in the one or more pressure containers 110, 120 and in the one or more feed lines 111, 121 is typically significantly higher than the pressure in the one or more removal lines 113, 123. When a removal of fuel 104 is requested after fueling (for example, by the energy converter 103), the one or more removal lines 113, 123 may experience a relatively high pressure surge in which the pressure in the one or more removal lines 113, 123 rises relatively quickly. This may result in a relatively high loading for the one or more removal lines 113, 123, for the one or more pressure sensors 116, 126, for the pressure converter 102, and for any connection elements. Furthermore, due to the rapid compression of the remaining fuel mass in the one or more removal lines 113, 123 when the pressure container valves 206 are opened, the temperature in the one or more removal lines 113, 123 may rise significantly. In this case, the temperature rise can typically be detected by the temperature sensor of the one or more pressure sensors 116, 126 only with a time delay, so that no (correct) temperature compensation of the sensor data of the one or more pressure sensors 116, 126 of the one or more removal lines 113, 123 can be performed, which may lead to inaccuracies in the determination of the pressure in the one or more removal lines 113, 123. This may in turn negatively affect a function, such as leak monitoring, of the pressure container valves 206 of the one or more pressure containers 110, 120.

The control unit 150 of the pressure container system 100 can be configured to detect an operating situation in which the internal pressure in a pressure container 110, 120 is higher, in particular higher by a certain percentage or by a certain absolute value, than in the removal line 113, 123 of the pressure container 110, 120. This may be the case, for example, as the result of a fueling of the pressure container 110, 120.

Furthermore, the control unit 150 can be configured to cause one or more actions to be taken so that the pressure in the removal line 113, 123 approximates the internal pressure in the pressure container 110, 120 (for example, to a value that is below the internal pressure by a certain offset value) prior to a fuel removal request for operating the energy converter 103.

In particular, the pressure container valve 206 of the pressure container 110, 120 can be opened in a pulse-based manner or continuously to supply fuel 204 from the pressure container 110, 120 into the removal line 113, 123 (without a fuel removal request by the energy converter 103 being present for this). The pressure container valve 206 can be opened at different times and/or in response to different triggers, such as:

already during the fueling procedure;
as soon as (during a fueling procedure) there is no longer a pressure rise in the pressure container 110, 120;
as soon as the fuel filler flap of the fueling access point 101 is closed; when the driver's door of the vehicle is opened after a fueling procedure;
when it is recognized that the driver of the vehicle is absent (for example, by means of a seat occupancy sensor, an interior camera, a seat belt, etc.); and/or
when the vehicle is started (but a fuel removal request by the energy converter 103 is not yet present).

By preliminarily approximating the pressure in the removal line 113, 123 to the internal pressure of the pressure container 110, 120, a pressure surge when the pressure container valve 206 opens in response to a fuel removal request by the energy converter 103 can be reliably avoided. The loading on the pressure container system 100 (for example, due to a pressure surge in the lines 113, 123 and/or due to a relatively high flow velocity at the valve seat of the pressure container valve 206) can thus be reduced. Furthermore, reliable fuel removal for operating the energy converter 103 can thus be ensured. In particular, the measurement accuracy of the pressure sensor 116, 126 in the removal line 113, 123 can be increased, which allows a precise pressure balancing of the fuel pressure in the removal line 113, 123 and in the pressure container 110, 120 and/or which allows a reliable operation of a safety function (for example, a monitoring of an excess mass flow).

In other words, during the fueling of a pressure container 110, 120, the pressure container valve 206 can be actuated in a clocked manner (for example, in the millisecond range, such as 15-75 ms) such that the removal line 113, 123 is (at least partially) filled. If necessary, this can be done without fully opening the pressure container valve 206. Alternatively, a complete opening of the pressure container valve 206 can be effected. In this case, the pressure container valve 206 is completely opened preferably only for a relatively short period of time (for example, 0.3-2 seconds) during a fueling procedure so that the "fueling in progress with valve 206 open" condition is as short as possible and thus the advantages of a separate feed line 111, 121 and removal line 113, 123 for certain fault conditions and/or malfunctions (such as a leak in the removal line 113, 123, a defective pressure converter 102 with a corresponding pressure rise in the intermediate pressure line to the energy converter 103, etc.) are predominantly maintained.

An alternative or supplemental time for (possibly clocked) actuation of the pressure container valve 206 is a time immediately following a fueling procedure:

when there is no longer a pressure rise in the pressure container 110, 120 and/or when the fill level of the pressure container is at least 93% or 95%; and/or
when the fuel filler flap is closed.

Alternatively or additionally, the pressure container valve 206 can be actuated at a point in time during the removal preparation for removal of fuel 104, for example, when the vehicle has been started and the pressure container valve 206 must be opened for the removal. In this case, a relatively short, clocked sequence of opening pulses of the pressure container valve 206 may precede the actual removal.

The one or more pressure container valves 206 may be actuated depending on the pressure difference between the pressure in the feed line 111, 121 and the pressure in the removal line 113, 123. In a pressure container system 100 having a plurality of pressure containers 110, 120, the pressure container valves 206 of the different pressure containers 206 may be actuated sequentially (not all valves 206 simultaneously, in particular only one valve 206 at a time per switching operation). In this way, the number of cycles of the valve actuations and thus the loading on the valves 206 can be reduced. On the other hand, the removal line 113, 123 can still be filled step by step (in a clocked manner—depending on the actuation sequence).

By actuating the pressure container valve 206 of a pressure container 110, 120 in such a manner during fueling, the pressure in the removal line 113, 123 can be aligned with the internal pressure of the pressure container 110, 120. Furthermore, for a subsequent removal request for fuel 104 (for example, when the vehicle is moving off), the time period until the readiness for removal is established may be reduced. Further, the above-described effect of a distorted pressure measurement can be eliminated or at least reduced.

Alternatively or additionally, the pressure balancing or pressure approximation between the filling path 111, 121 and the removal path 113, 123 can be implemented directly following a completed fueling procedure and/or shortly before an expected removal request. For example, a pressure approximation can be triggered via driver presence detection (door being opened, seat occupancy, etc.). Alternatively or additionally, a pressure approximation can be triggered with a time delay of a certain delay time (for example, 10 seconds) after the end of the fueling procedure (for example, once a pressure rise is no longer detected in the pressure container 110, 120 or once the fuel filler flap has been closed).

Preferably, the removal path 113, 123 (in particular in a case in which a removal is not requested immediately afterwards) is not filled to the pressure in the fueling path 111, 113 (in particular to the pressure in the one or more pressure containers 110, 120), but only to the fueling pressure minus a certain offset value (for example, 50 bar, or variable, approximately minus 5-20% of the fueling pressure). Thus, (based on the pressure difference between the internal pressure in the pressure container 110, 120 and the pressure in the removal line 113, 123) a diagnosis of the tightness of the one or more closed pressure container valves 206 can be made possible.

The (possibly clocked) opening of the pressure container valve 206 of a pressure container 110, 120 during a fueling procedure and/or the alignment or approximation of the pressure in the removal line 113, 123 with/to the pressure in the feed line 111, 121 make it possible to validate the plausibility of the pressure in the feed line 111, 121 with the pressure measurement of the pressure in the removal line 113, 123 during the fueling procedure currently in progress. In this way, the diagnostic capability and thus the safety during fueling (for example, in the event of a failed pressure sensor 118, 128 in a feed line 111, 121 during fueling or in the event of a fault in the pressure detection) can be increased.

The control unit 150 can be configured to provide an extended emergency operation function for a fueling procedure. In particular, the control unit 150 can be configured to detect that, during a fueling procedure currently in progress, the pressure sensor 118, 128 of the feed line 111, 121 to a pressure container 110, 120 has a defect and/or has failed. In response to this, the pressure container valve 206 (in particular the OTV) of the pressure container 110, 120 can be actuated in a clocked manner or continuously in order to balance the pressure in the removal line 113, 123 with the pressure in the feed line 111, 121.

The sensor data of the pressure sensor 116, 126 of the removal line 113, 123 can then be used to further monitor the fueling. Thereby, in particular in the case of a permanent opening of the pressure container valve 206, a so-called COM fueling can furthermore be enabled, in which case a feedback with respect to the system pressure is given to the fuel pump for the fueling in order to allow a higher fill level of the pressure container 110, 120 within the fueling procedure currently in progress. The feedback relating to system pressure can be provided on the basis of the sensor data of the pressure sensor 116, 126 from the removal line 113, 123.

If necessary, the pressure container valves 206 of all (in particular both) pressure containers 110, 120 of the pressure container system 100 can be opened, or at least the pressure container valve 206 of the pressure container 110, 120 that has the lower pressure loss in the fueling path (which, in the case of equally sized pressure containers 110, 120, is the pressure container 110, 120 with the shorter feed line 111, 121). This can ensure that the maximum system pressure within the pressure container system 100 can be detected (and reported back, if necessary) on the basis of the sensor data of the pressure sensor 116, 126 of a removal line 113, 123.

Balancing the pressure in the removal line 113, 123 to the pressure in the feed line 111, 121 allows the system pressure, in particular the internal pressure in the one or more pressure containers 110, 120, to be determined with increased accuracy following a fueling procedure. The pressure indicated by the pressure sensor 118, 128 in the feed line 111, 121 has a relatively large dynamic component (caused by the pressure loss over the feed line 111, 121) depending on the position of the pressure sensor 118, 128 (relatively close to the fueling access point 101 or relatively close to the pressure container 110, 120). Thus, by measuring the pressure in the removal line 113, 123 during or following a fueling procedure, the fill level of the one or more pressure containers 110, 120 can be determined with increased accuracy (since the pressure in the removal line 113, 123 has no dynamic component and since the pressure measurement in the removal line 113, 123 is not distorted by the media temperature of the fueling mass flow). In particular, the consistency of the fill level display (fill level with open valve 206 vs. fill level with closed valve 206) can be increased in this way.

Figure 3:
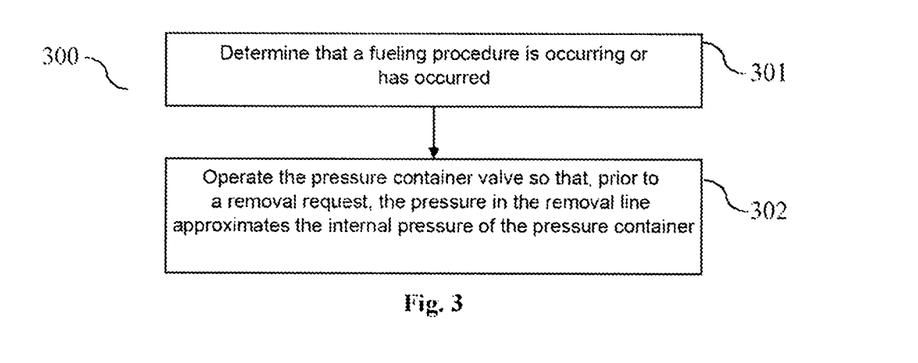
FIG. 3 shows a flowchart of an exemplary method for setting the pressure in a removal line of a pressure container.

FIG. 3 shows a flowchart of an exemplary (possibly computer implemented) method 300 for operating a pressure container system 100. In particular, the method 300 is designed to increase the accuracy of operation of the pressure container system 100 during or following a fueling procedure and/or to reduce the loading of the pressure container system 100 caused by a fueling procedure.

The pressure container system 100 comprises at least one pressure container 110, 120 having a pressure container valve 206 (in particular an OTV), wherein the pressure container valve 206 is designed to direct fuel 104 from the pressure container 110, 120 into a removal line 113, 123 of the pressure container 110, 120 for supplying an energy converter 103 (in particular a fuel cell stack).

The method 300 comprises determining 301 that a fueling procedure of the pressure container 110, 120 is occurring or has occurred. This can be recognized based on, for example, the fact that the pressure in the feed line 111, 121 to the pressure container 110, 120 is rising and/or the fact that the fueling access point 101 is open.

Furthermore, in response to the recognized fueling procedure, the method 300 comprises a step of causing 302 the pressure container valve 206 to be opened temporally prior to a removal request for fuel 104 for operating the energy converter 103. Thus, already temporally before a (first-time) removal request, fuel 104 can be conducted from the pressure container 110, 120 into the removal line 113, 123 in order to approximate the pressure in the removal line 113, 123 to the pressure in the pressure container 110, 120, and/or in order to reduce the pressure difference between the internal pressure in the pressure container 110, 120 and the pressure in the removal line 113, 123. In this regard, the pressure difference can be reduced in a precise manner by a pulsed or clocked opening of the pressure container valve 206.

The measures described in this document can allow a particularly conserving and precise operation of a pressure container system 100 (especially following a fueling procedure).

The present invention is not limited to the exemplary embodiments presented. In particular, it should be noted that the description and figures are intended merely to illustrate the principle of the proposed methods, devices and systems.

LIST OF REFERENCE SIGNS 100 pressure container system
101 fueling access point
102 pressure converter
103 energy converter
104 fuel
110, 120 pressure container
111, 121 feed line
112, 122 valve device
113, 123 removal line
116, 126 pressure sensor (removal line)
118, 128 pressure sensor (feed line)
150 control unit
201 inflow interface
202 inflow filter
203 outflow interface
204, 205 flow restriction unit
206 electrically actuatable valve
207 manual valve (parallel to the electrically actuatable valve)
208 evaluation unit
209 pressure relief valve
210 data interface
211 ventilation unit
212 outflow filter
213 temperature sensor
214 manual valve (in series with the electrically actuatable valve)
215 check valve (parallel to the electrically actuatable valve)
216 coupling point
221 inflow channel
222 common channel
223 outflow channel
300 method for setting the pressure in a removal line of a pressure container
301, 302 method steps

The invention claimed is:

1. A control unit for a pressure container system comprising at least one pressure container including a pressure container valve designed to conduct fuel from the pressure container into a removal line for supplying an energy converter, wherein the control unit is configured:
   to determine that a fueling procedure of the pressure container is occurring or has occurred; and
   in response thereto, to cause the pressure container valve to open temporally prior to a removal request for fuel for operating the energy converter so that a pressure in the removal line approximates a pressure in the pressure container.

2. The control unit according to claim 1, wherein the control unit is configured to cause the pressure container valve to open in a pulse-based and/or temporally limited manner during the fueling procedure so that fuel is conducted from the pressure container into the removal line.

3. The control unit according to claim 1, wherein the control unit is configured to cause the pressure container valve to open in a pulse-based manner temporally prior to the removal request for fuel for operating the energy converter.

4. The control unit according to claim 3, wherein the control unit is configured to cause the pressure container valve to open at most within 400 milliseconds.

5. The control unit according to claim 1, wherein the control unit is configured:
   to determine that the fueling procedure has been completed based on one or more indices; and
   in response thereto, to cause the pressure container valve to open prior to the removal request for fuel so that fuel is conducted from the pressure container into the removal line.

6. The control unit according to claim 5, wherein the one or more indices comprise:
   a fact that there is no longer a pressure rise in the pressure container;
   a fact that the pressure container has reached or exceeded a specific fill level;
   a fact that a fueling access point of the pressure container system has been closed; and/or
   a fact that a user of the energy converter is preparing for an activation of the energy converter and for an associated removal request for fuel.

7. The control unit according to claim 5, wherein the control unit is configured to cause the pressure container valve to open a predetermined time after it has been determined that the fueling procedure has been completed.

8. The control unit according to claim 1, wherein the control unit is configured to control the pressure container valve in order to set a pressure in the removal line that lies below the pressure in the pressure container by a specific offset value.

9. The control unit according to claim 1, wherein the control unit is configured to control the pressure container valve in such a way that, when a removal request is present, the pressure in the removal line lies below the pressure in the pressure container by a specific offset value.

10. The control unit according to claim 8, wherein the offset value lies between 20 bar and 100 bar; and/or wherein the offset value is between 10% and 20% of the internal pressure of the pressure container.

11. The control unit according to claim 1, wherein the control unit is configured:
   to cause the pressure in the removal line during the fueling procedure to approximate and/or align with the pressure in the pressure container;
   to determine sensor data of a pressure sensor in the removal line; and
   to determine and/or to check the pressure in a feed line to the pressure container via which the fueling procedure is performed, based on the sensor data of the pressure sensor in the removal line.

12. The control unit according to claim 11, wherein the control unit is configured:
   to determine a system pressure of the pressure container system during the fueling procedure based on the sensor data of the pressure sensor in the removal line; and
   to send the system pressure to a fueling unit from which fuel for the fueling procedure is provided.

13. The control unit according to claim 11, wherein the control unit is configured:
   to determine sensor data of a pressure sensor in a feed line to the pressure container via which the fueling procedure of the pressure container is performed;
   to compare the pressure displayed by the sensor data of the pressure sensor in the feed line with the pressure displayed by the sensor data of the pressure sensor in the removal line; and
   to control the fueling procedure of the pressure container and/or the pressure container valve depending on the comparison.

14. The control unit according to claim 1, wherein the control unit is configured:
   to cause the pressure in the removal line to approximate and/or align with the pressure in the pressure container;
   to determine sensor data of a pressure sensor in the removal line; and
   to determine and/or to check a fill level of the pressure container based on the sensor data of the pressure sensor in the removal line.

15. The control unit according to claim 1, wherein the control unit is configured to cause the pressure container valve to be opened during the fueling procedure on the whole for at most 5% or less of a total duration of the fueling procedure so that the pressure in the removal line during the fueling procedure approximates the pressure in the pressure container.

16. The control unit according to claim 1, wherein
   the pressure container system comprises at least two pressure containers each having a pressure container valve; and
   the control unit is configured to cause:
   the pressure container valves of the at least two pressure containers to be opened in succession and/or in alternation so that the pressure in the removal line approximates the pressure in the pressure container; and/or
   the pressure container valve of the pressure container which has a lower pressure loss on a feed line for the fueling procedure to open so that the pressure in the removal line approximates the pressure in the pressure container.

17. The control unit according to claim 1, wherein the control unit is configured:
   to determine sensor data of a pressure sensor in a feed line to the pressure container via which a fueling procedure of the pressure container is performed; and
   to determine, based on the sensor data of the pressure sensor in the feed line, that a fueling procedure of the pressure container is occurring or has occurred.

18. The control unit according to claim 1, wherein the control unit is configured, once the pressure in the removal line has approximated the pressure in the pressure container,
   to determine that a removal request for fuel for operating the energy converter is present; and
   in response thereto, to cause the pressure container valve to open so that fuel is conducted from the pressure container into the removal line.

19. The control unit according to claim 1, wherein the control unit is designed to cause the pressure container valve to open only if the internal pressure of the pressure container is at least 30% of the maximum fueling end pressure or of the nominal working pressure.

20. A pressure container system comprising:
   at least one pressure container having a pressure container valve designed to conduct fuel from the pressure container into a removal line for supplying an energy converter; and
   a control unit according to claim 1, which is configured to control the pressure container valve.

21. A method for operating a pressure container system comprising at least one pressure container having a pressure container valve designed to conduct fuel from the pressure container into a removal line for supplying an energy converter, the method comprising:
   determining that a fueling procedure of the pressure container is occurring or has occurred; and
   in response thereto, causing the pressure container valve to open in a pulse-based manner temporally prior to a removal request for fuel for operating the energy converter so that the pressure in the removal line approximates the pressure in the pressure container.

* * * * *